(12) United States Patent
Matsuba et al.

(10) Patent No.: US 6,424,363 B1
(45) Date of Patent: Jul. 23, 2002

(54) IMAGE DISPLAY DEVICE, METHOD OF IMAGE DISPLAY, AND STORAGE MEDIUM FOR STORING IMAGE DISPLAY PROGRAMS

(75) Inventors: Junzo Matsuba; Toyoji Hiyokawa; Naokazu Ozaki, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/358,437

(22) Filed: Jul. 22, 1999

(30) Foreign Application Priority Data

Jul. 22, 1998 (JP) ............................................. 10-206935

(51) Int. Cl.[7] ............................................... G06K 15/00
(52) U.S. Cl. ........................................ 345/864; 345/815
(58) Field of Search .................................. 345/864, 853, 345/854, 855, 780, 769, 802, 798, 815, 818, 826, 829, 774, 776, 744–747, 689, 712–713; 707/503–504, 10

(56) References Cited

U.S. PATENT DOCUMENTS

| | | | |
|---|---|---|---|
| 5,247,663 A | * | 9/1993 | Busboom et al. ............ 345/780 |
| 5,367,619 A | * | 11/1994 | DiPaolo et al. ............ 345/780 |
| 5,572,644 A | * | 11/1996 | Liaw et al. |
| 5,627,948 A | * | 5/1997 | Fukunaga .................... 345/780 |
| 5,717,939 A | * | 2/1998 | Bricklin et al. ............. 345/769 |
| 5,786,819 A | * | 7/1998 | Weiser et al. ............... 354/854 |
| 5,805,164 A | * | 9/1998 | Blum |
| 6,236,400 B1 | * | 5/2001 | Guerrero .................... 345/854 |
| 6,282,551 B1 | * | 8/2001 | Anderson et al. ........... 707/503 |

* cited by examiner

Primary Examiner—Steven Sax
(74) Attorney, Agent, or Firm—Oliff & Berridge, PLC

(57) ABSTRACT

An image display device is provided that includes an information storage device in which names of destinations are stored; name obtaining unit for obtaining names from the information storage device on the basis of an input device and its operation; a display for displaying character strings on a menu screen; a name display unit for displaying names obtained by the name obtaining unit in respective rows in a plurality of areas on the menu screen; and a display change unit for displaying character strings of names in a plurality of rows upon determining whether character strings of names to be displayed cannot fit in the display area. When the operator operates the input device, names are obtained from the information storage device and if character strings of names to be displayed cannot fit in the display areas, the character strings of the names are displayed in a plurality of rows.

22 Claims, 11 Drawing Sheets

IMAGE DISPLAY DEVICE, METHOD OF IMAGE DISPLAY, AND STORAGE MEDIUM FOR STORING IMAGE DISPLAY PROGRAMS

The entire disclosure of Japanese Patent Application No, 10-206935 filed on Jul. 22, 1998 including specification, claims, drawings and summary are incorporated herein by reference in its entirely.

BACKGROUND OF THE INVENTION

1. Field of Invention

This invention relates to an image display device, an image display method, and a storage medium in which its program is stored.

2. Description of Related Art

In the prior art, a vehicle navigation system wherein if a destination is set by an operator, a route from a position where a vehicle is currently located, namely a present position, to the destination is searched and route guidance is performed on the basis of the searched route.

Therefore, the navigation system is equipped with a display, and menu screens such as an initial screen for setting a destination, a genre screen, a street selection screen, a city selection screen, an instruction start screen, etc., which are opened in the display. Thus, the operator can select predetermined items in respective menu screens.

For example, in the initial screen, a destination can be selected by genre, address, telephone number, memory point, etc. If a cursor destination is selected by genre, the operator moves a cursor to "genre" by operating a cursor knob, presses an input key, and the genre selection screen is opened.

Then, in the genre selection menu, a destination can be selected by city, station, airport, ferry terminal, hotel, restaurant, etc. For example, if the operator selects a destination by street, the operator moves the cursor to city by operating the knob, presses the input key, and the city selection screen is opened.

In the city selection screen, a destination can be selected by city name. Therefore, a plurality of city names are displayed in respective rows. Then, the operator moves the cursor to a predetermined city name by operating the knob, presses the input key, and the city is selected. Then, at the same time, a street selection screen is opened.

In the street selection screen, a destination can be selected by street name. Therefore, a plurality of street names are displayed in respective rows on the street-selection screen. Then, the operator moves the cursor to a predetermined street name by operating the knob, presses the input key, and the street is selected. Then, at the same time, an instruction start screen is opened.

On the instruction start screen, a message to promote an instruction for starting route guidance from a present position to a set destination is displayed. Then, the operator presses the input key, a destination corresponding to the selected city and street is set, and at the same time, the present position and the peripheral map around the present position are displayed on the display. Next, route guidance is started.

However, in the above navigation system, if a large number of characters are displayed on respective menu screens, such as, for example, a city, street, etc., having a long name, the name cannot fit in one row within the menu screen. This is especially true in a small type of navigation system.

In that case, the operator cannot set a destination correctly because names of city, street, etc., have to be identified solely by the portion fit in one row or, for example, the first half of the name.

Therefore, it is thought that the operator scrolls names of the selected city, street, etc., on the menu screen by pressing a predetermined key, thereby the last half of the name is made to be displayed. However, as the last half of the name is displayed, the first portion of the name disappears from the menu screen, and as a result, the operator is not able to see the entire character string of the name.

SUMMARY OF THE INVENTION

This invention provides an image display device, an image display method, and a storage medium in which programs are stored, wherein the problem of the prior navigation system is resolved by having a capability of setting a destination correctly and increasing the visibility of items on the screen.

In order to solve the above problem, an image display device of the invention includes an information storage device in which names of destination are stored, an input device, a name obtaining unit for obtaining names from the information storage device on the basis of the operation of an input device, a display device for displaying character strings on a menu screen, a name display unit for displaying the obtained names by the name obtaining unit, respectively, in a plurality of display areas set on the menu screen, and a display change unit for displaying character strings of names, respectively, in a plurality of rows if it is determined that character strings of names to be displayed do not fit, respectively, in the display areas.

Another image display device of the invention further includes a command for specifying a display area on a menu screen, and a communication device for transmitting character string data in order to display character strings.

The display change unit changes the display area specified by the command into a plurality of areas if the character string of a name to be displayed does not fit in the display area.

The invention may further include an image memory in which a screenful of image data of a menu screen is stored. The display change unit manipulates image data within the image memory if character strings of names do not fit, respectively, in the display areas.

An image display method of the invention includes the steps of obtaining names of destinations from an information storage device on the basis of the operation of an input device, displaying the obtained names, respectively, in a plurality of display areas set on a menu screen, and determining whether character strings of names to be displayed can fit in the display areas and displaying character strings of names, respectively, in a plurality of rows if they do not fit in the display areas.

A storage medium of the invention stores a program including the steps of obtaining destination names from the information storage device on the basis of the operation of the input device, displaying the obtained names in respective rows in a plurality of display areas set on a menu screen, and determining whether character strings of names to be displayed fit in the display areas and displaying character strings of names, respectively, in a plurality of rows if they do not fit in the display areas.

These and other objects, features and advantages of the invention will be apparent from the following more particu-

DETAILED DESCRIPTION OF PREFERRED EMBODIMENTS

The embodiments of the invention will be precisely described below with reference to the drawings.

Figure 1:
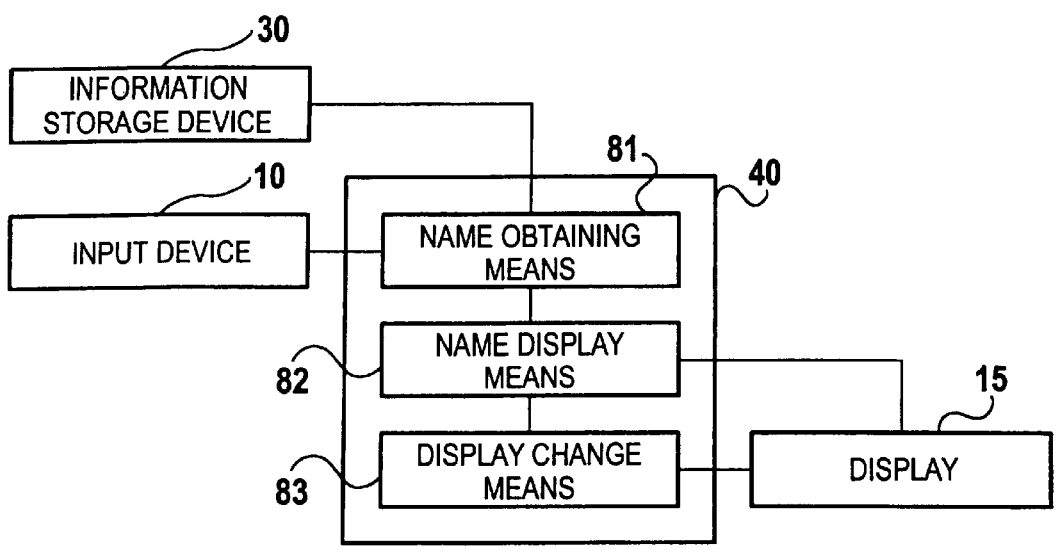
FIG. 1 is a functional block diagram of the image display device according to the first embodiment of the invention.

FIG. 1 is a functional diagram of an image display device according to the first embodiment of the invention.

This figure shows an input device 10, a display device 15 for displaying character strings on a menu screen, an information storage device 30 as a storage medium in which names of destinations are stored, a CPU 40, a name obtaining unit 81 for obtaining names from the information storage device 30 on the basis of the operation of the input device 10, a name display unit 82 for displaying names obtained by the name obtaining means 81 in respective rows in a plurality of display areas set on the menu screen, and a display change unit 83 for displaying character strings of the names, respectively, in a plurality of rows if it is determined that character strings of names cannot fit, respectively, in the display areas.

Figure 2:
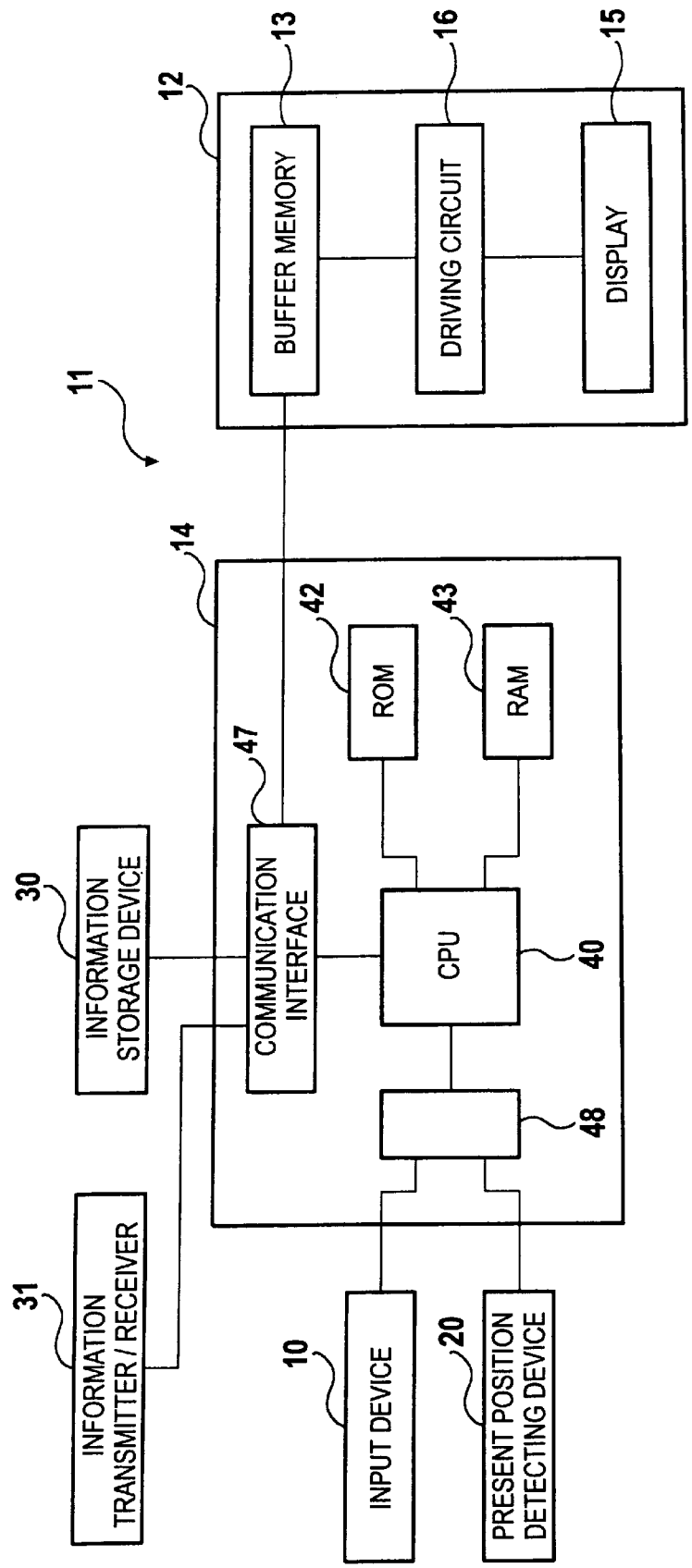
FIG. 2 is a control block diagram of the navigation system according to the first embodiment of the invention.

FIG. 2 is a control block diagram of the navigation system according to the first embodiment of the invention.

This figure shows a navigation device 11, including an input device 10 for setting destinations and inputting various information by an operator, an output device 12 for outputting various information by an image, a voice, etc., a central processing unit 14 for executing the control of the navigation device 11 together with executing route search processing, route guidance processing, display processing, etc., a present position detecting device 20 for detecting a present position, an information storage device 30 as a storage medium in which navigation data necessary for searching a route from a present position to a destination and display data necessary for guiding a route, etc., are stored, and an information transmitter/receiver 31 for transmitting/receiving various data.

And, the central processing unit 14 comprises a CPU 40, a ROM 42, a RAM 43, a communication interface 47 for communication and an input interface 48. The communication interface 47 is equipped to communicate with the CPU 14, the input device 10, the information storage device 30 and the information transmitter/receiver 31. Further, the input interface 48 is equipped to communicate with the CPU 14, the input device 10 and the present position detecting device 20. Moreover, the ROM 42 and RAM 43 are included as the storage medium.

The input device 10 includes a knob for the cursor, an input key, an operation switch, a memory key, etc., which is made to input destinations in genre, address, telephone number, memory point, coordinate on map, etc., by operating the input device 10. Moreover, instead of using the knob for the cursor, the input key, the operation switch, the memory key, etc., the input device may use a touch switch which is combined together with a display 15 placed in the input device 10 and a voice recognition device for enabling a voice input and a storage card reading device for reading data stored in an IC card, magnet data, etc. Furthermore, the input device 10 can be located on the driver's instrumental panel or as a remote control.

The output device 12 comprises a buffer memory 13 for temporarily storing an image signal transmitted from the central processing unit 14, a driving circuit 16 and a display 15, wherein the driving circuit 16 opens a menu screen, a map screen, a route set screen, a section image screen, an intersection image screen, a route guidance screen, etc., in the display 15 according to the image signal. The display 15 may include a black-and-white CRT, a black-and-white LCD (Liquid crystal display) display device, a color CRT, a color LCD, etc. In this case, the image signal includes a command for specifying a predetermined display area on respective screens opened in the display 15 according to coordinates, such as X and Y coordinates, and character string data for forming character strings to be displayed in the display area, for example, such as binary data.

Accordingly, in the central processing unit 14, the image forming unit of the CPU 40 generates a command to specify a display area, and at the same time, it generates binary data in order to form an image in the display area and transmits the command and binary data on the basis of the respective display areas through the communication interference 47 to the output device 12. On the other hand, the output device 12 forms an image according to binary data in the display area in the display 15 specified by the command as the command and binary data are transmitted from the central processing unit 14.

For example, when the present position is changed as a vehicle is traveling, then the image change unit of the CPU 40 generates a command regarding a display area where the image is changed, and at the same time, generates binary data only for that display area. Therefore, as the driving circuit 16 receives a command and binary data regarding a display area where an image is changed, the driving circuit 16 accesses to the buffer memory 13 and changes a portion of the binary data within the buffer memory 13. Since images regarding other display areas are not changed during that time, corresponding binary data within the buffer memory 13 are not changed.

Further, other than the display 15, the navigation device may also be equipped with speakers to audibly output route guidance, a printer to print out images of the menu screen, a map screen, route guidance screen, etc.

Between an information center in which data necessary for navigation is accumulated and information sources of an electronic note book, etc., in which operator's own data such as map data, destination data, etc., are pre-stored, the information transmitter/receiver 31 transmits/receives data through a communication line. For example, a cellular telephone (a car telephone), a data transmitter/receiver, etc., for receiving a corrective signal of GPS using a FM multiple signal, which can be used.

The present position detecting device 20 includes an absolute direction sensor for detecting an absolute direction formed by a GPS receiver by making use of the global positioning system (GPS), a beacon receiver, geomagnetism sensor, etc., a relative distance sensor for detecting a relative direction formed by a vehicle sensor, a steering sensor, a gyro, etc., and a distance sensor for detecting a travel distance on the basis of the number of turns of the wheels, etc.

The information storage device 30, stores map data, intersection data, photograph data, registered point data, guide point data, destination data, telephone number data, address data, city selection data, and street selection data, etc., necessary for searching and guiding routes, in respective databases.

Further, the information storage device 30, the ROM 42 and RAM 42 are composed of, for example, a magnet core, a semiconductor memory, etc. In place of using the information storage device 30, the ROM 42 and RAM 43, various types of storage medium such as a magnet tape, a magnet disc, a floppy disc, a magnet drum, a CD, a MD, a DVD, an optical disc, an IC card, an optical card, etc., can be used.

In the present embodiment, various programs are stored in the ROM 42 and various data are stored in the information storage device 30. However, various programs and data can also be stored in the same external storage medium. In this case, for example, the central processing unit 14 is equipped with a flash memory, which enables the reading out of various programs and data from the external storage medium to be written in the flash memory. Therefore, the various programs and data can be updated by exchanging the external storage medium.

In a navigation device 11 having the above structure as the operator operates the input device 10 in order to set a destination, then a menu screen, such as an initial screen, a genre screen, a city selection screen, a street selection screen, an instruction start screen, etc., for setting a destination on the display 15, is opened, and the operator selects a predetermined item within the menu screen.

Figure 3:
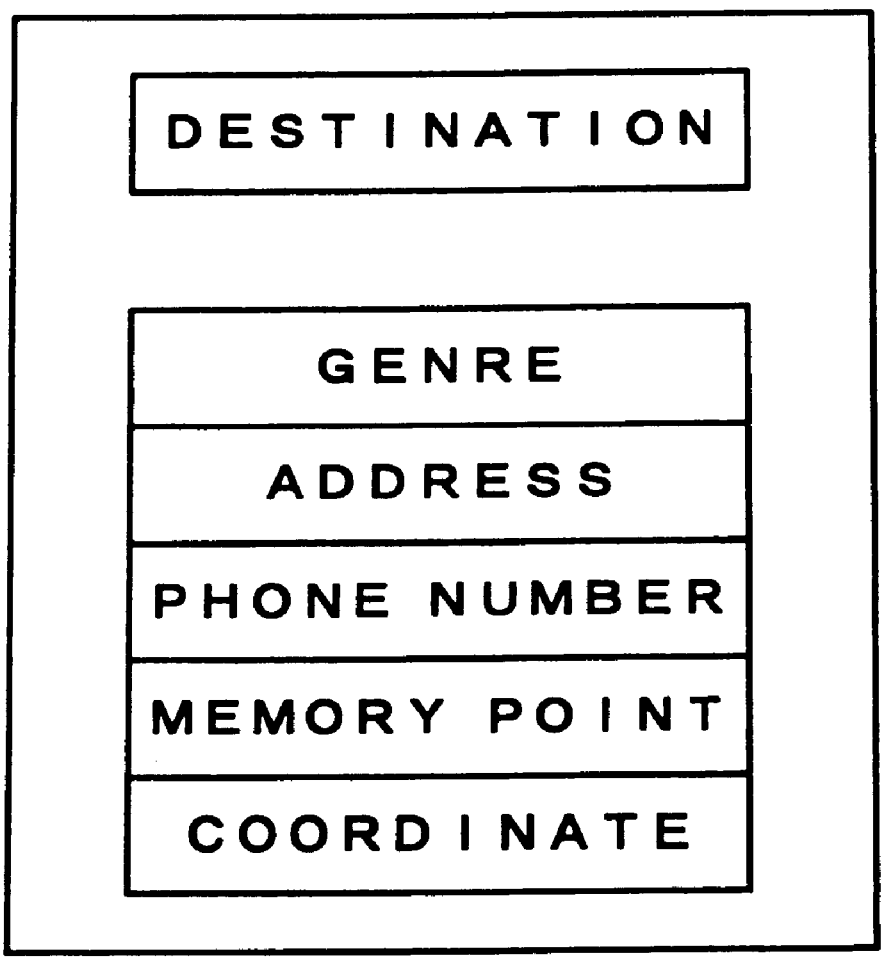
FIG. 3 is a diagram showing an example of initial screen according to the first embodiment of the invention.
Figure 4:
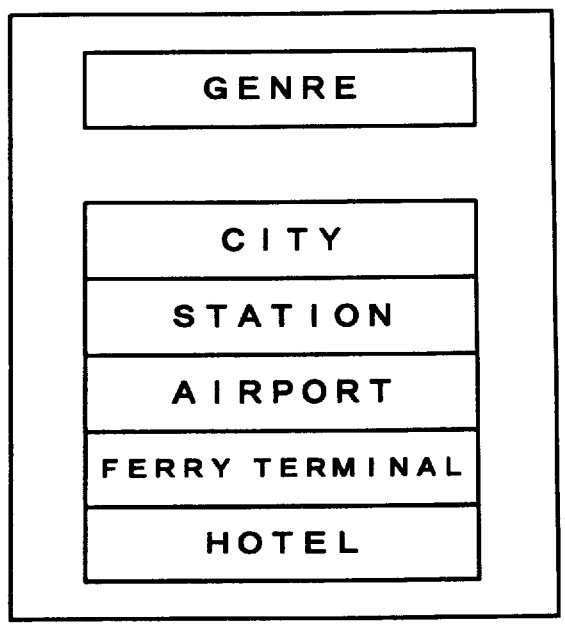
FIG. 4 is a diagram showing an example of genre selection screen according to the first embodiment of the invention.
Figure 5:
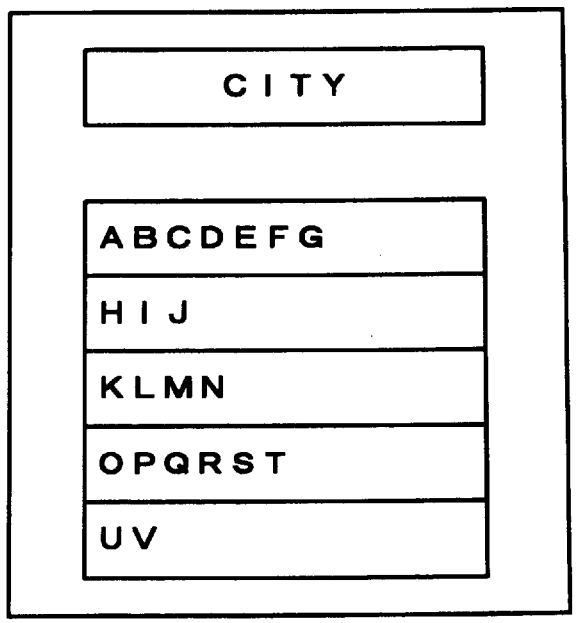
FIG. 5 is a diagram showing an example of city selection screen according to the first embodiment of the invention.
Figure 6:
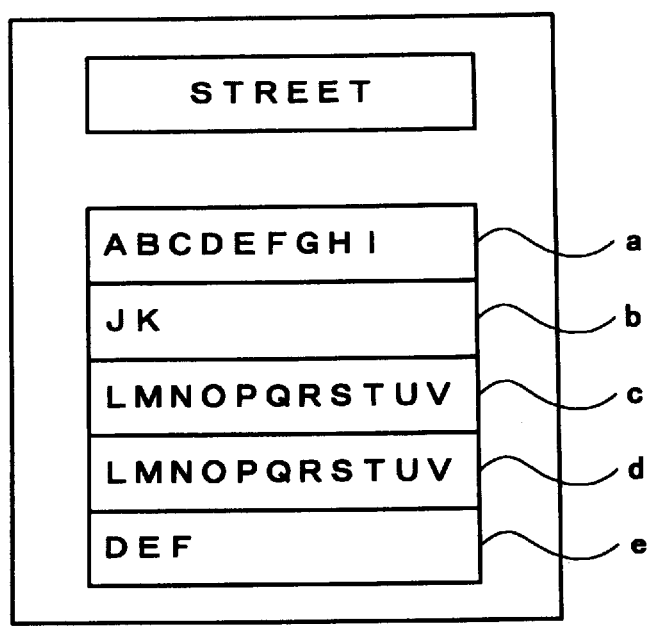
FIG. 6 is a diagram showing an example of street selection screen according to the first embodiment of the invention.
Figure 7:
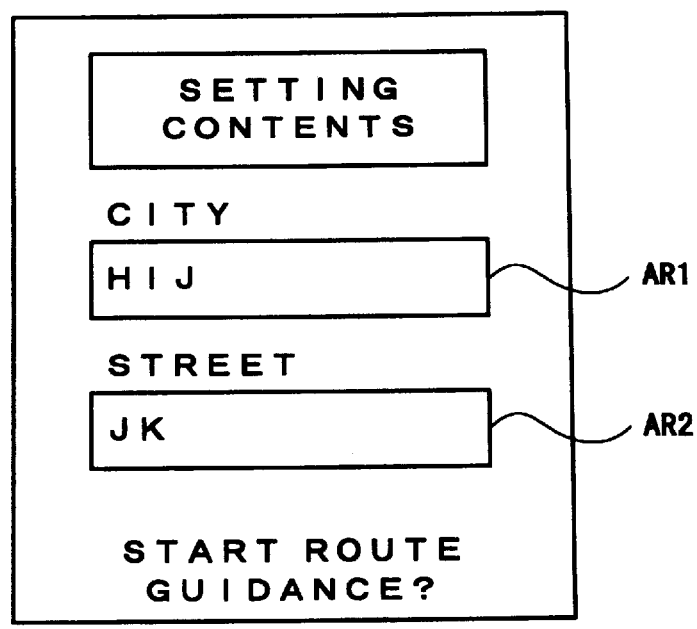
FIG. 7 is a diagram showing an example of instruction start screen according to the first embodiment of the invention.
Figure 8:
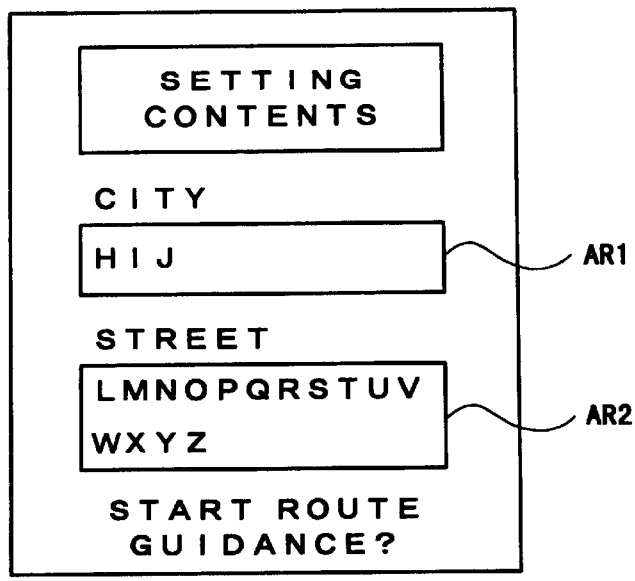
FIG. 8 is a diagram showing another example of initial start screen according to the first embodiment of the invention.
Figure 9:
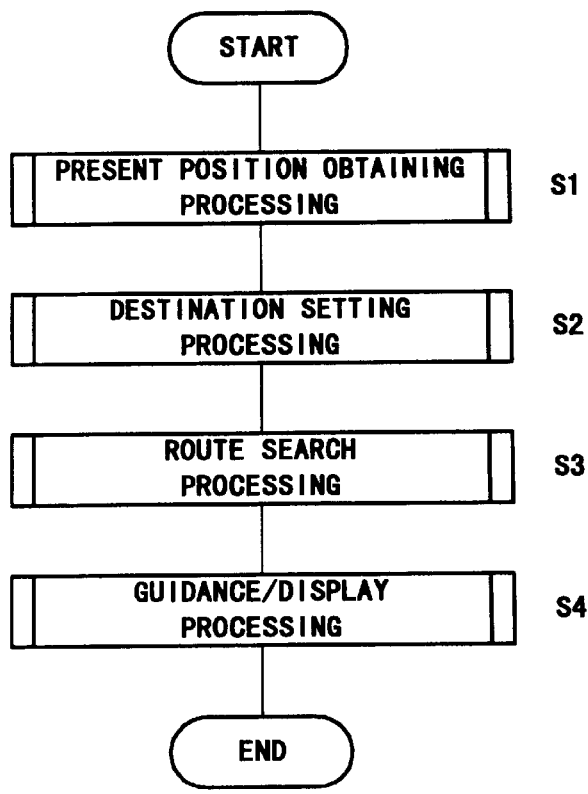
FIG. 9 is the main flowchart showing a series of performances of the navigation system according to the first embodiment of the invention.
Figure 10:
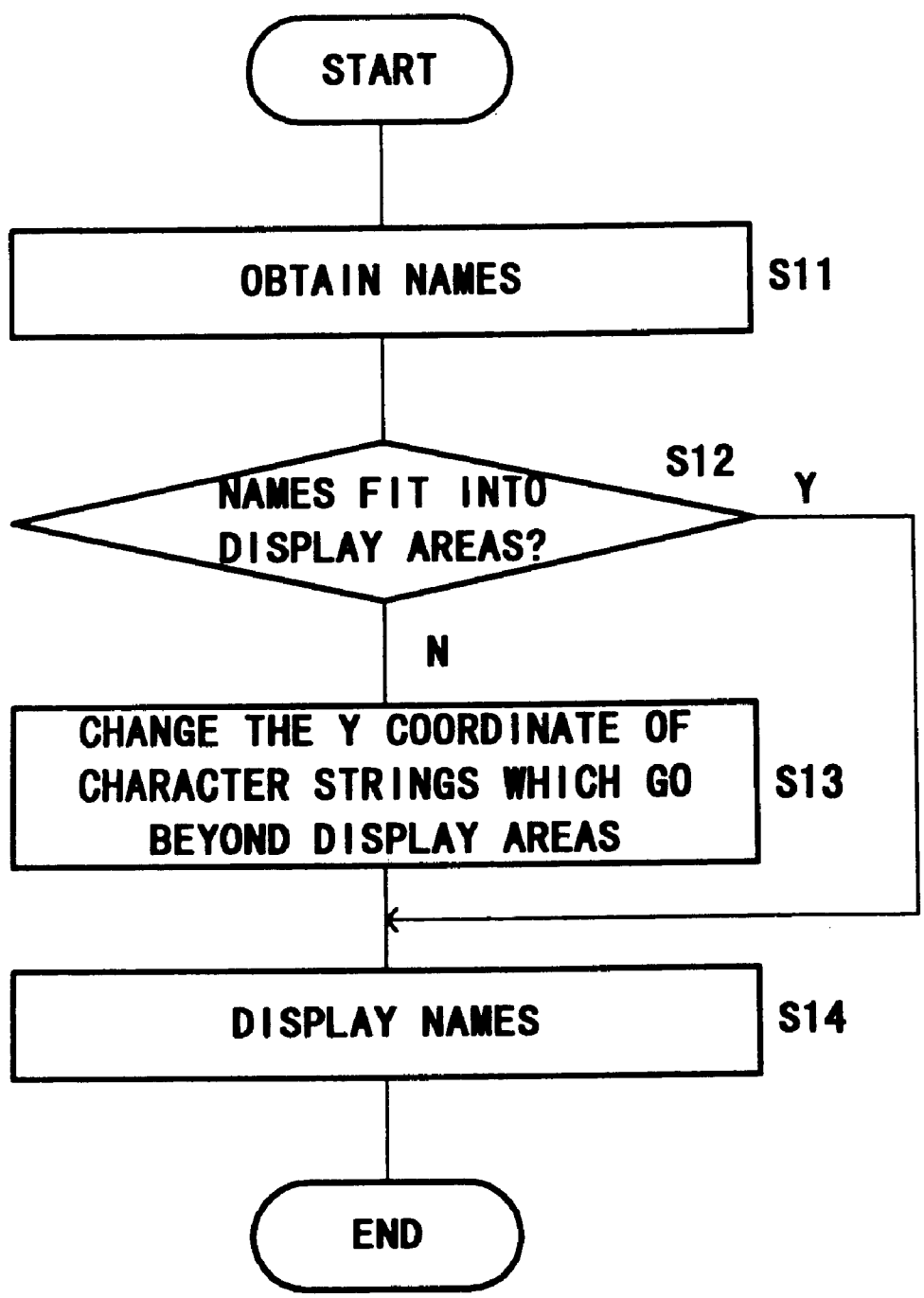
FIG. 10 is a flowchart showing a series of performances of the navigation system according to the first embodiment of the invention.

FIG. 3 is a diagram showing an example of an initial screen according to the first embodiment of the invention, FIG. 4 is a diagram showing an example of a genre selection screen according to the first embodiment of the invention, FIG. 5 is a diagram showing an example of a city selection screen according to the first embodiment of the invention, FIG. 6 is a diagram showing an example of street selection screen according to the first embodiment of the invention, FIG. 7 is a diagram showing an example of an instruction start screen according to the first embodiment of the invention, FIG. 8 is a diagram showing another example of an instruction start screen according to the first embodiment of the invention, FIG. 9 is a main flowchart showing a series of performances of the navigation system according to the first embodiment of the invention, and FIG. 10 is a flowchart showing a series of performances of the destination display processing according to the first embodiment of the invention.

First of all, the present position detecting device 20 (FIG. 2) detects the present position during the present position obtaining process, and the destination setting unit of the CPU 40 executes a destination setting process according to an operation made by the operator.

Therefore, the navigation device 11 is equipped with a display 15, wherein menu screens for setting a destination in the display 15, such as an initial screen, a genre screen, a city selection screen, a street selection screen, an instruction start screen, etc., are opened, and the operator selects predetermined items in the respective menu screens.

When the driving circuit 16 is driven, an initial screen, such as that shown in FIG. 3, is opened on the display 15. In the present embodiment, for example, a destination can be selected using respective items such as genre, address, telephone number, memory point, coordinate, etc. For example, if a destination is selected in genre, the operator operates a knob for the cursor and moves the cursor to genre, then presses an input key, and the genre selection screen as shown in FIG. 4, is opened.

In the genre selection screen, a destination can be selected as a city, station, airport, ferry terminal, hotel, restaurant, etc. For example, if a destination is selected such as a street, the operator first operates the knob to move the cursor to city, presses the input key, and a city selection screen, as shown in FIG. 5, is opened.

In the city selection screen, a destination can be selected using city names, therefore, the name display unit 82 (FIG. 1) within the CPU 40 reads city selection data from the information storage device 30 and displays a plurality of city names in respective rows on the city selection screen. Then, the operator operates the knob to move the cursor to a predetermined city name presses the input key, the city name is selected, and the street selection screen, as shown in FIG. 6, is opened.

In the street selection screen, a destination can be selected using street names, therefore, the name display means 82 reads street selection data from the information storage device 30 and displays a plurality of street names in respective rows on the street selection screen. Then, the operator operates the knob to move the cursor to a predetermined street name, presses the input key, the street name is selected, and an instruction start screen, as shown in FIG. 7, is opened.

Further, in the present embodiments, a destination is to be specified in the order of city and street, however it can be also specified in the order of street and city.

Display areas AR1 and AR2 for displaying the selected names are established on the instruction start screen. Thus, a city name and a street name are displayed in the display areas of AR1 and AR2 as well as a message to accomplish an instruction to start route guidance from a present position to a destination. Then, the operator confirms the destination, presses the input key, and the destination is set.

Thus, in setting the destination as described above, the route search unit of the CPU 40 searches a route from the present position to the destination by executing route processing. As the route is searched, the guidance/display unit of the CPU 40 opens a route guidance screen on the display 15 by executing guidance/display processing, displays the present position and the peripheral map of the present position on the route guidance screen, and starts route guidance.

Further, when a large number of characters should be displayed on the respective menu screens, especially in a small type of navigation apparatus, a city name, a street name, etc., cannot be displayed in one row. For example, in FIG. 6, display areas of a a–e, respectively, consisting of one row, are established on the street selection screen. Names of streets are displayed as "LMNOPQRSTUV" in display areas of c and d. However, if actual street names are, respectively, "LMNOPQRSTUVWXYZ" and "LMNOPQRSTUAAAA", the character strings of "WXYZ" and "AAAA" do not fit in respective display areas of c and d. In this case, the operator is required to recognize the street names only by "LMNOPQRSTUV" which are portions, respectively, fit in the display areas c and d. Therefore, the destination may not be set correctly.

Then, the display area of AR2 of the instruction start screen is made to be capable of displaying the street name in a plurality of rows, for example, displaying in two rows. Therefore, when destination display processing is executed, if the operator selects a street on the street selection screen by pressing the input key, the name obtaining unit 81 of the CPU 40 obtains the selected street name. Next, the display change unit 83 of the CPU 40 estimates a bit number of the character font of the obtained street name and judges whether the name can fit in the display area of AR2 upon determining whether the estimated bit number exceeds the total bit number of one row of the street selection screen.

Then, if the name does not fit in the display area of AR2, the display change unit 83 changes the Y coordinate for displaying an unfitted character string into one row below, transmits respective binary data of the first portion of the character string and the last portion of the character string to the output device 12, and displays the character string of the obtained name into two rows.

Accordingly, if the actual street name is "LMNOPQRSTUVWXYZ", the CPU 40 transmits a command for maintaining a space of two rows in the display area of AR2 as an image signal to the output device 12. The CPU 40 also transmits binary data of the first portion of the character string of the street name "LMNOPQRSTUV" displayed in the first row and binary data of the last portion of the character string of the street "WXYZ" displayed in the second row, to the output device 12.

In the output device 12, as the command and binary data are transmitted from the central processing unit 14, the driving circuit 16 stores binary data in the buffer memory 13, maintains a space of two rows in the display area of AR2 according to the command and displays the first portion of the character string "LMNOPQRSTUV" in the first row and the last portion of the character string "WXYZ" in the second row, as shown in FIG. 8.

Accordingly, in the small type of navigation, the entire portion of the street name is displayed on the display 15 so that the operator is able to see the entire street name at once. As a result, the visibility can be increased so that a destination can be set correctly.

Further, regarding the city name, if a portion of the city name does not fit in a display area of a city selection screen, in the instruction start screen, the first portion of the city name can be displayed in the first row and the last portion of the city name can be displayed in the second row.

A flowchart shown in FIG. 9 will be described next.

Step S1: Execute present position obtaining processing.

Step S2: Execute destination setting processing.

Step S3: Execute route search processing.

Step S4: Execute guidance/display processing.

A flowchart shown in FIG. 10 will be described next.

Step S11: The name obtaining unit 81 obtains the selected names.

Step S12: The display change unit 83 determines whether the names can be fit in respective display areas. If the names can fit in respective areas, move to Step 14 and if they cannot fit in respective display areas, move onto Step S13.

Step S13: The display change unit 83 changes the Y coordinate of character strings which exceed respective display areas.

Step S14: Display names.

Next, the second embodiment of the invention will be described. With regard to the embodiment having the same structure as the image display device of the first embodiment, the description will be omitted by using the same reference numbers as in FIG. 1.

Figure 11:
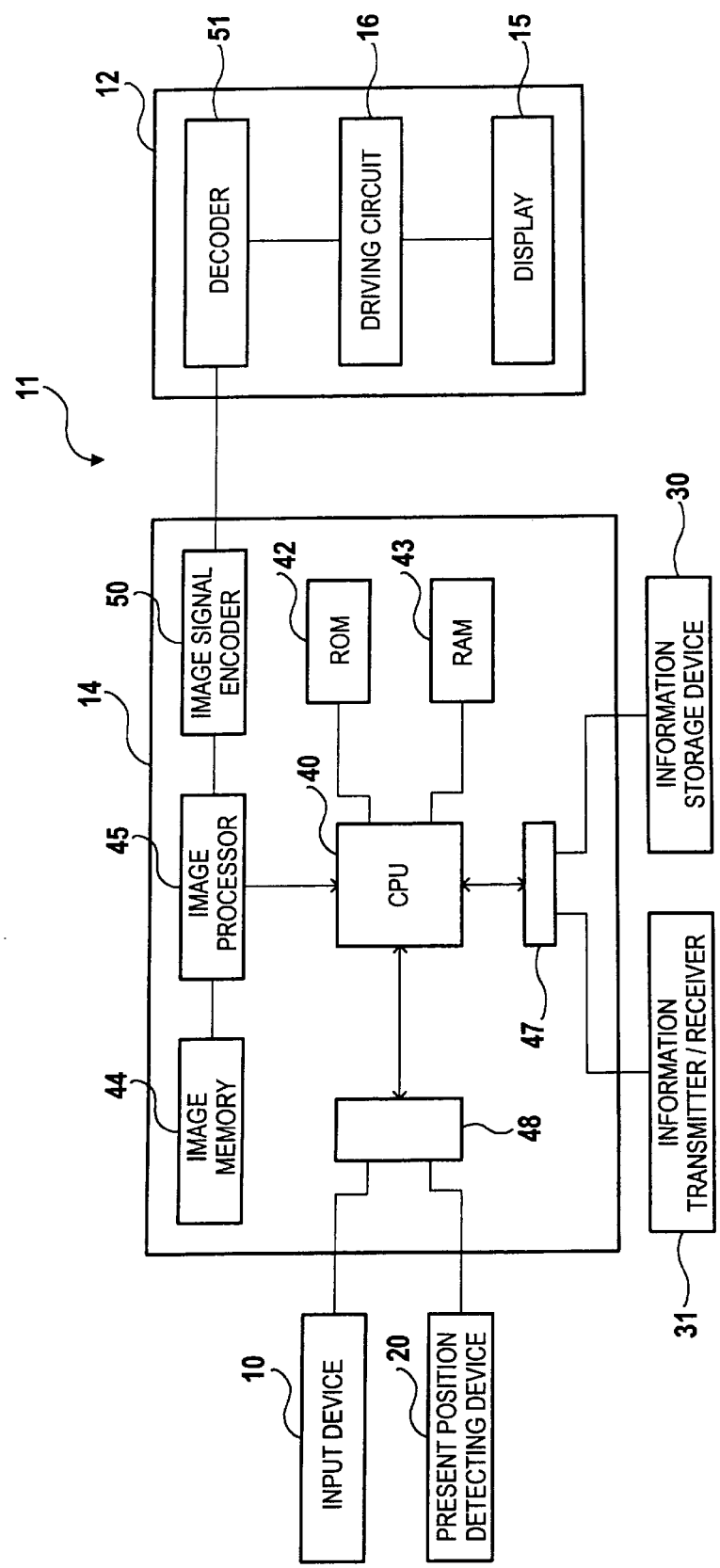
FIG. 11 is a control block diagram of the navigation system according to the second embodiment of the invention.
Figure 12:
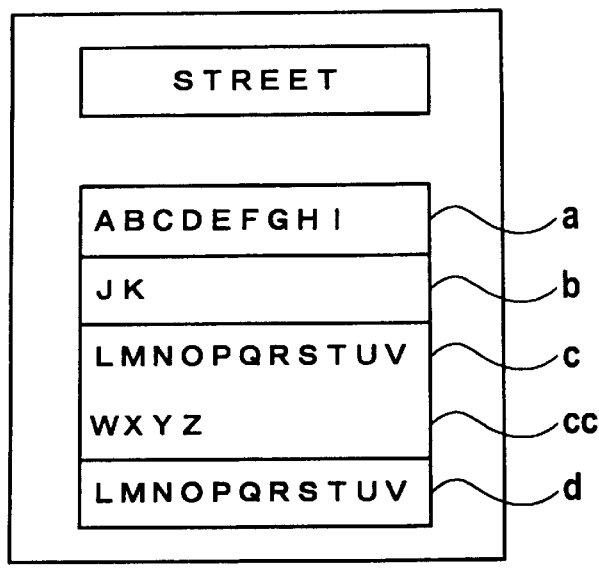
FIG. 12 is a diagram showing an example of street selection screen according to the second embodiment of the invention.

FIG. 11 is a control block diagram of the navigation device according to the second embodiment of the invention, and the FIG. 12 is a diagram showing an example of a street selection screen according to the second embodiment of the invention.

In this case, a central processing unit 14 includes an image memory 44 for storing a RGB signal as a screenful of image data for the display 15, an image processor 45 for reading out the RGB signal from the image memory 44 according to a display output control signal from the CPU 40, and for displaying route guidance information on the display 15 by performing an image processing on the RGB signal and drawing a map, and an image signal encoder 50 for changing the RGB signal on which image processing is performed by the image processor 45 to a video signal based on the NTSC system, and transmitting the video signal as an image signal to a output device 12.

In the output device 12, the image signal is changed into binary data by the decoder 51 as the image signal is transmitted from the central processing unit 14. A driving circuit 16 forms an image responsive to image data within the image memory 44 on the display 15 based on the binary data.

In this case, because the RGB signal is changed into the video signal based on the NTSC system, the signal line can be made as one line. Accordingly, the central processing unit 14 can be easily mounted in an output device 12 comprising a video input terminal, so that the general versatility can be improved and the cost of the navigation can be reduced.

In addition, the RGB signal may also be transmitted directly to the output device 12. In that case, the image signal encoder 50 and decoder 51 are no longer required. However, it is still required to connect the central processing unit 14 and the output device 12 by a special-purpose line consisting of four signal lines.

In the present embodiment, a screenful of the RGB signals of the display 15 are to be stored in the image memory 44. Accordingly, the RGB signal stored in the image memory 44 can be easily manipulated.

Then, as the operator selects the street by pressing an input key on the street selection screen of FIG. 6, the name obtaining unit 81 (FIG. 1) obtains the selected street names. Next, the display change unit 83 of the CPU 40 estimates a bit number of the character font of the obtained street name and determines whether the name can fit the display area of c by determining whether the estimated bit number exceeds the total bit number of one row of the street selection screen.

If the name cannot fit in the display area of c, the display change unit 83 manipulates the RGB signal within the image memory 44, changes the Y coordinate of character string which does not fit in the area to one row below, transmits respective binary data of the first portion of the character string and the last portion of the character string to the output device 12, and displays a character string of the obtained name in two rows.

Therefore, if the actual street name is "LMNOPQRSTUVWXYZ", the CPU 40 maintains a memory area of two rows in the image memory 44 in order to store the RGB signal corresponding to all the character strings of street name "LMNOPQRSTYUVWXYZ".

As a result, in the output device 12, the driving circuit 16 makes a display area of cc in one row below the display area of c on the street selection screen, as shown in FIG. 12. Thus, when an image signal is transmitted from the central processing unit 14, the character string "LMNOPQRSTUV" of the first portion of the street name is displayed in the display area of c and the character string "WXYZ" of the last portion of the street name is displayed in the display area of cc.

Additionally, a display area of d is also made in one row below as the display area of cc is made in one row below of the display area of c.

Therefore, in the small type of navigation device, the entire portion of the street name is displayed in the display 15 so that the operator is able to see the entire street name at once. As a result, the visibility can be increased.

Further, upon determining the length of a name to be displayed in the display 15, if the name is too long, so that it goes beyond a display area, the display area can be controlled in order to be capable of displaying the entire name by changing the display area within the list. In addition, the display area can also be controlled only for a name indicated by the cursor in response to the movement of the cursor for selecting a name. Furthermore, the display area can be controlled only when the cursor is stopped for a predetermined time. The display area may also be controlled as to display the entire name by setting an area for displaying a name on the upper end, lower end, right side or left side, etc., if the name goes beyond the display area because of a long name.

In the navigation device 11 having the aforementioned structure, the CPU 40 opens a route guidance screen on the display 15 at the step of the guidance/display processing and displays the present position and the peripheral map around the present position on the route guidance screen.

As the operator presses a memory key which is predetermined for registering a memory point, the present position on the map displayed on the route guidance screen and is registered as a memory point.

Figure 13:
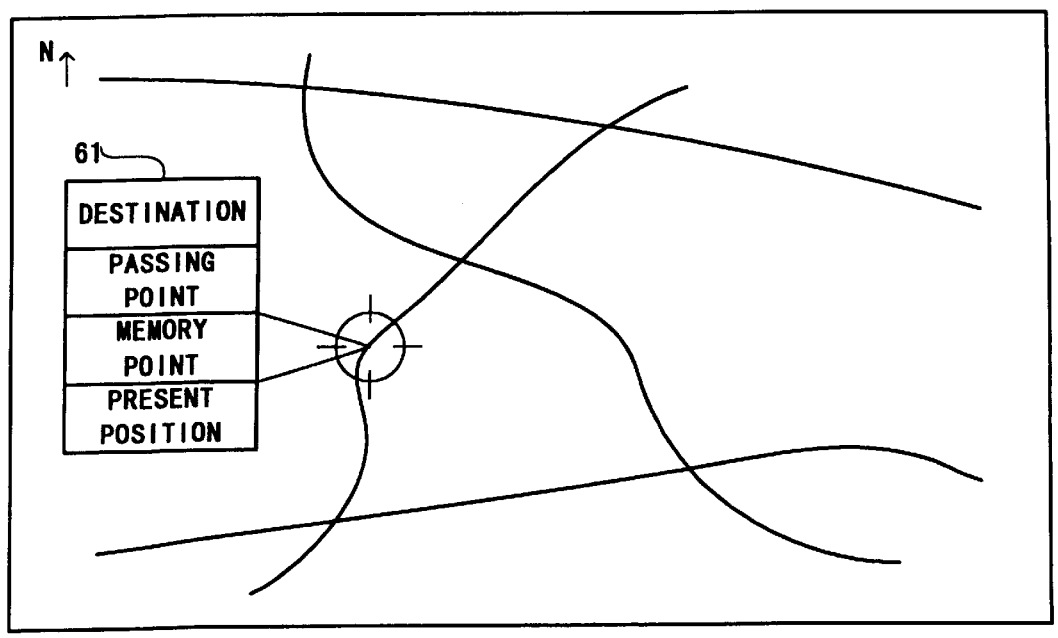
FIG. 13 is a diagram showing an example of route guidance screen.

FIG. 13 is a diagram showing an example of a route guidance screen.

In the figure, a registration list 61 is formed on the route guidance screen, and mode alternatives, such as a destination, a passing point, a memory point and a present position, etc., are displayed on the registration list 61. As the operator moves the cursor on the registration list and presses a memory key, a position of the cursor is registered as a destination, a passing point, a memory point, or a present position, etc., and stored in the information storing device 30 (FIG. 2).

For example, if memory registration is required while a vehicle is traveling, a memory point can be registered simply by pressing the memory key. Therefore, the memory registration is unnecessarily carried out through a small operation error.

Further, if a memory point is registered only when a complex input operation is carried out in the input device 10, this results in the difficulty of carrying out memory registration while the vehicle is traveling. Moreover, it may be suggested that a special-purpose operation key is equipped in order to carry out the memory registration. However, the operational part becomes complicated, and as a result, an operability of the input device 10 is decreased.

Hence, the third embodiment of the invention which provides an input device capable of improving the operability of memory registration, will be described next. With regard to the embodiment having the same structure as the image display device of the first embodiment, the description will be omitted by using the same reference numbers as in FIG. 1.

Figure 14:
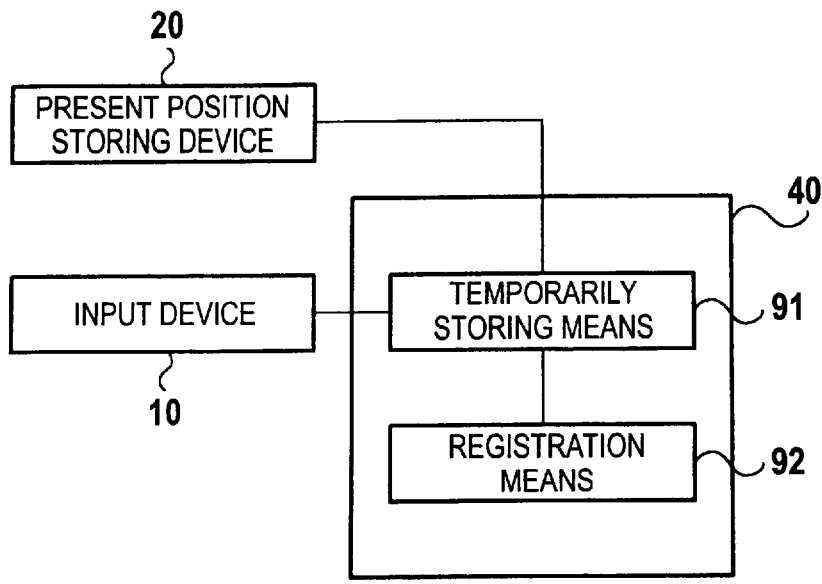
FIG. 14 is a functional block diagram of the navigation registration system according to the third embodiment of the invention.
Figure 15:
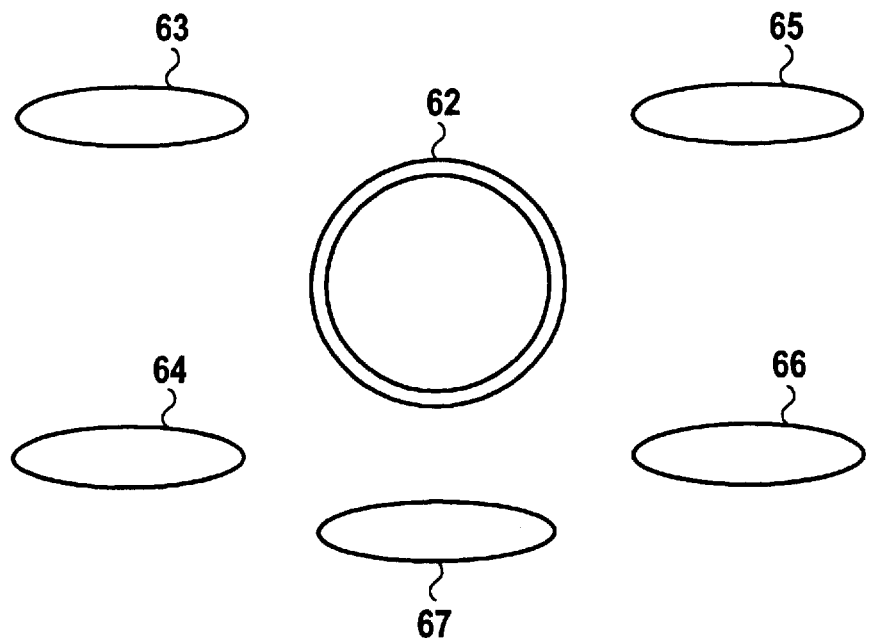
FIG. 15 is a diagram showing operational parts of the navigation system according to the third embodiment of the invention.
Figure 16:
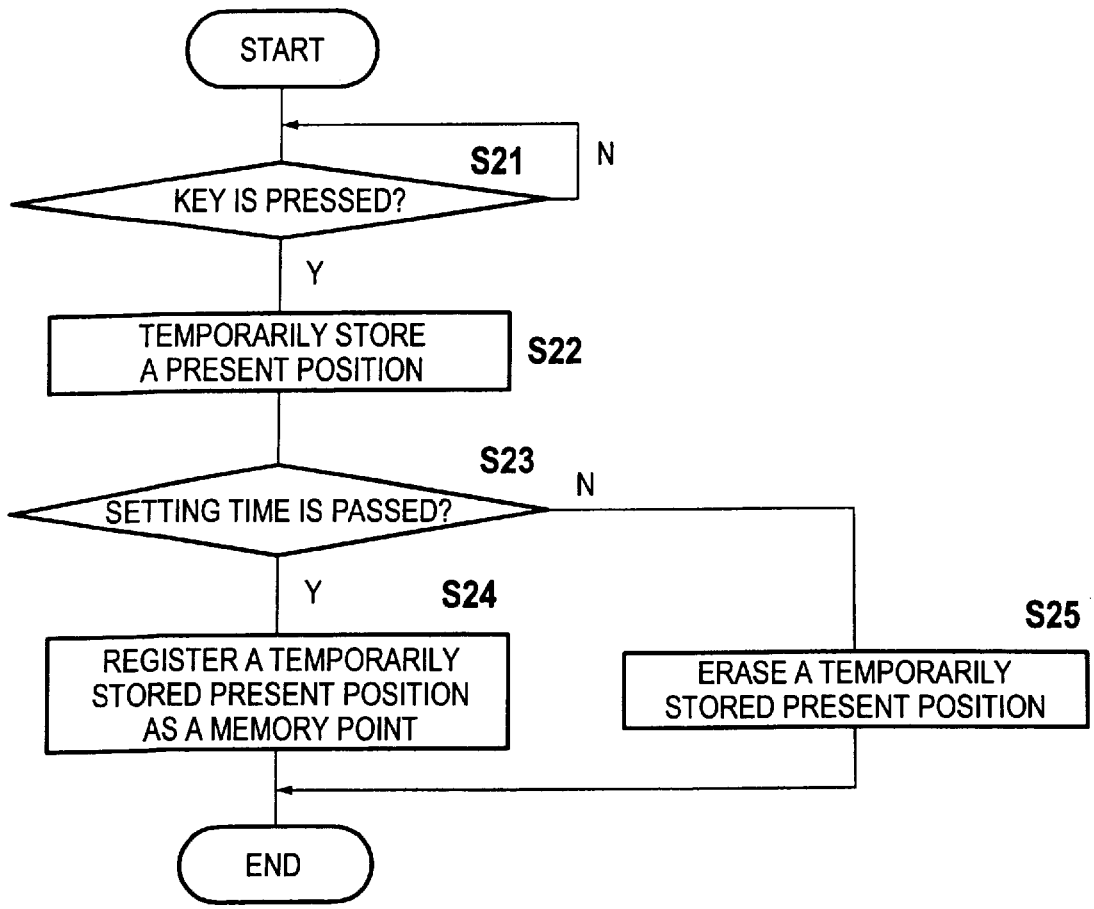
FIG. 16 is a flowchart showing a series of performances of the navigation system according to the third embodiment of the invention.

FIG. 14 is a functional diagram of the navigation registration device according to the third embodiment of the invention, FIG. 15 is a diagram showing operational parts of the input device according to the third embodiment of the invention, and FIG. 16 is a flowchart showing a series of performances of the navigation device according to the third embodiment of the invention.

FIG. 14 shows an input device 10, a present position detecting device 20 for detecting a present position, a CPU 40, is a temporarily storing unit 91 for temporarily storing a present position detected by the present position detecting device 20 based on operation of the input device 10, and a registration unit 92 for registering a present position temporarily stored when the registration requirement is achieved and erasing a temporarily stored present position when the registration requirement is not achieved.

FIG. 15 shows a knob 62 for cursor, audible guidance key 93 of the navigation device, an initial screen key 64 for opening the initial screen or the display 15 (FIG, 2), a detour key 65 for displaying a detour on a route guidance screen, a previous menu screen key 66 for displaying one previous menu screen at the step of destination setting processing, and is an input key 67. In the present embodiment, when the route guidance screen is opened, guidance is audibly output by pressing the audible guidance key 63, the initial screen is opened by pressing the initial screen key 64, a detour is displayed on the route guidance screen by pressing the detour key 65. However, one previous screen is not opened even by pressing the previous screen key 66 because destination setting processing is not being carried out. Therefore, the previous screen/memory key 66 is shared with a register key for carrying out previous screen/memory memory registration in the present embodiment.

When the previous screen/memory key 66 is pressed for a short time, the memory point registration is not carried out so as to prevent the memory registration from being carried out unnecessarily, and the memory registration is carried out only when the previous screen/memory key 66 is pressed continuously for over a setting time.

Therefore, as the key 66 is pressed, temporarily storing unit 91 of the CPU 40 starts a time check with a stored timer, at the same time, it stores a present position in a buffer. Then, the registration unit 92 of the CPU 40 determines whether the setting time is passed, and the registration requirement is achieved by the registration requirement unit. If the registration requirement is achieved, a temporarily stored present position is registered as a memory point which is then registered in the information storing device 30. On the other hand, if the previous screen/memory key 66 is released before the setting time is passed, the registration means 92 erases the temporarily stored present position.

Thus, if the previous screen/memory key 66 is continuously pressed, namely, only when the registration requirement is achieved, the memory point registration cannot be unnecessary carried out through a small operation error.

Further, a memory point can be easily registered while the vehicle is traveling because the complex input operation is not required in the input device 10. In addition, the special-purpose key for carrying out the memory registration is not required to be equipped, so that operation parts, such as an instrumental panel, a remote control, etc., can be simplified, which results in improving the operability of the input device 10.

Furthermore, because the present position is temporality stored when the previous screen/memory key 66 is pressed, even the vehicle is traveling through a different position when the setting time is passed, the present position when the key 66 is started to be pressed can be still registered as a memory point.

In the small type of the navigation device, memory registration is not carried out unnecessarily through operational error because the menu screen and the route guidance screen for registering a memory point, which cannot opened together at the same time.

In the present embodiment, a memory point is registered only when the previous screen/memory key 66 is continuously pressed for the setting time. However, the memory point can also be registered only when the previous screen/memory key 66 is pressed intermittently for several times and two predetermined keys out of the keys 63–66 are pressed together at the same time.

Referring to the flowchart in FIG. 16:

Step S21: Determining whether the previous screen/memory key 66 is pressed while a route guidance screen is being opened. If the previous screen/memory key 66 is pressed, move on to step S22 and if it is not pressed, stand by.

Step S22: The temporarily storing unit temporarily stores a present position.

Step S23: Registration requirement determining unit determines whether a setting time is passed as the previous screen/memory key 66 is held pressed. If the setting time is passed, move on to step S24 and if it is not passed, move on to step S25.

Step S24: Register the temporarily stored present position as a memory point.

Step S25: Erase the temporarily stored present position.

The invention is not limited to the embodiments described above, such that various modifications are possible in the light of the above teachings without departing from the true spirit and scope of the invention.

As described above, according to the invention, an image display device, including an information storage device in which names of destinations are stored, an input device, a name obtaining unit for obtaining names from the information storage device on the basis of the operation of the input device, a display device for displaying character strings on a menu screen, a name display unit for displaying names obtained by the name obtaining unit in respective rows in a plurality of areas set on the display menu, and display change unit for displaying character strings of names in a plurality of rows if they cannot fit in the display areas upon determining whether character strings of names to be displayed can fit, respectively, in the display areas.

In this case, when the operator operates the input device, names are obtained from the information storage device, character strings of the names are displayed in respective rows in a plurality of display areas set on the menu screen of the display device. In determining whether character strings of names to be displayed can fit in the display areas, if they cannot fit, respectively, in the display areas, the character strings of the names are displayed in a plurality of rows.

Therefore, in the small type of the navigation device, because the entire name is also displayed in the display device, the operator is able to see the entire name at once. As a result, the visibility is increased so that the destination can be set correctly.

What is claimed is:

1. A navigation device comprising:
   an information storage device in which names of destinations are stored;
   an input device;
   a name obtaining unit that obtains the names from the information storage device based on an operation of the input device;
   a display device that displays character strings on a menu screen;
   a name display unit that lists the names obtained by the name obtaining unit in respective rows in a plurality of respective display areas established on the menu screen;
   a display change unit that arranges the character strings of the names into a plurality of rows in the respective display areas if it determines that the character strings of the names to be displayed do not fit in the respective display areas; and
   a route guidance display that performs route guidance to a destination which is based on the operation of the input device from the names to be displayed.

2. The navigation device according to claim 1, further comprising:
   a display command unit that specifies a size of the respective display areas on the menu screen based on a determination made by the display change unit.

3. The navigation device according to claim 2, further comprising:
   a communication device that transmits the character string data to the display device based on the determination made by the display change unit.

4. The navigation device according to claim 3, wherein the display change unit changes the display area specified by the display command unit to a plurality of rows if it determines that a character string of a name to be displayed does not fit in the respective display area.

5. The navigation device according to claim 4, wherein the display change unit estimates a bit number of a character font of the obtained name and determines whether the obtained name can fit in the respective display area by determining whether the estimated bit number exceeds a total bit number of one row of the menu screen.

6. The navigation device according to claim 5, wherein if the obtained name does not fit in the respective display area, the display change unit changes a Y coordinate for displaying the character string that would not fit in the one row of the menu screen, to one or more Y coordinates directly below the one row, and the communication device transmits a respective binary data of the character strings to the display device to display the character string in a plurality of rows.

7. The navigation device according to claim 1, further comprising:
an image memory that stores a screenful of an image data of the menu screen, wherein the display change unit manipulates the image data within the image memory if it determines that the character strings of the names to be displayed do not fit in the respective display areas.

8. A method for displaying a navigational image, comprising the steps of:
obtaining names of destinations from an information storage device based on an operation of an input device;
listing the obtained names in a plurality of respective display areas established on a menu screen;
determining whether character strings of the obtained names to be displayed fit in the respective display areas;
changing an arrangement of character strings of the obtained names into a plurality of rows if the determining step determines that the character strings to be displayed do not fit in the respective display areas; and
displaying a route guidance to a destination which is based on the operation of the input device from the names to be displayed.

9. The method according to claim 8, further comprising:
specifying a size of the respective display areas on the menu screen based on a determination made in the determining step.

10. The method according to claim 9, further comprising:
transmitting the character string data to a display device based on the determination made in the determining step.

11. The method according to claim 10, wherein the changing step changes the display area specified in the specifying step to a plurality of rows if it is determined in the determining step that a character string of a name to be displayed does not fit in the respective display area.

12. The method according to claim 11, further comprising:
estimating a bit number of a character font of the obtained name; and
determining whether the obtained name can fit in the respective display area by determining whether the estimated bit number exceeds a total bit number of one row of the menu screen.

13. The method according to claim 12, wherein if the obtained name does not fit in the respective display area, the changing step changes a Y coordinate for displaying the character string that would not fit in the one row of the menu screen, to one or more Y coordinates directly below the one row, and the transmitting step transmits a respective binary data of the character strings to the display device to display the character string in a plurality of rows.

14. The method according to claim 8, further comprising:
storing a screenful of an image data of the menu screen in an image memory; and
manipulating the image data within the image memory if the determining step determines that character strings of the names to be displayed do not fit in the respective display areas.

15. A storage medium that stores programs for displaying a navigational image:
a program for obtaining names of destinations from an information storage device based on an operation of an input device;
a program for listing the obtained names in a plurality of respective display areas established on a menu screen;
a program for determining whether character strings of names to be displayed fit in the respective display areas;
a program for changing an arrangement of character strings of the names into a plurality of rows if the determining step determines that the character strings of the names to be displayed do not fit in the respective display areas; and
a program for displaying a route guidance to a destination which is based on the operation of the input device from the names to be displayed.

16. The storage medium according to claim 15, further comprising:
a program for specifying a respective display area on the menu screen based on a determination made in the determining step.

17. The storage medium according to claim 16, further comprising:
a program for transmitting the character string data to a display device based on the determination made in the determining step.

18. The storage medium according to claim 17, wherein the program for changing changes the display area specified by the program for specifying to a plurality of rows if the program for determining determines that a character string of a name to be displayed does not fit in the respective display area.

19. The storage medium according to claim 18, further comprising:
a program for estimating a bit number of a character font of the obtained name; and
a program for determining whether the obtained name can fit in the respective display area by determining whether the estimated bit number exceeds a total bit number of one row of the menu screen.

20. The storage medium according to claim 19, wherein if the obtained name does not fit in the respective display area, the program for changing changes a Y coordinate for displaying the character string that would not fit in the one row of the menu screen, to one or more Y coordinates directly below the one row, and the program for transmitting transmits a respective binary data of the character strings to the display device to display the character string in a plurality of rows.

21. The storage medium according to claim 15, further comprising:
a program for storing a screenful of an image data of the menu screen in an image memory; and
a program for manipulating the image data within the image memory if the program for determining determines that the character strings of the names to be displayed do not fit in the respective display areas.

22. The navigation device according to claim 1, wherein the display change unit arranges the character strings of the plurality of rows according to a movement of a cursor for selecting the names, wherein when the character strings of the names is positioned by the cursor is off a display area, the character string containing such name is displayed by the plurality of rows.

* * * * *